Sept. 1, 1970  J. W. MAYO ET AL  3,526,139
DETECTOR PANELS-MICROMETEOROID IMPACT
Filed Nov. 21, 1968  2 Sheets-Sheet 1

INVENTORS
JAMES W. MAYO
BY WALTER M. COOK, JR

ATTORNEYS

United States Patent Office

3,526,139
Patented Sept. 1, 1970

3,526,139
DETECTOR PANELS-MICROMETEOROID IMPACT
James W. Mayo and Walter M. Cook, Jr., Newport News, Va., assignors to the United States of America as represented by the Administrator of the National Aeronautics and Space Administration
Filed Nov. 21, 1968, Ser. No. 777,766
Int. Cl. G01d 21/00
U.S. Cl. 73—432                 10 Claims

ABSTRACT OF THE DISCLOSURE

A large area meteoroid detector panel fabricated from two sheets of metal attached together to form a pressure vessel which contain a plurality of cells and one or more sensing devices. Meteoroids penetrating one of the shuts cause a loss of pressure within the panel which loss is detected by one of the sensing devices.

ORIGIN OF INVENTION

The invention described herein was made by employees of the United States Government and may be manufactured and used by or for the Government for governmental purposes without the payment of any royalties thereon or therefor.

Micrometeoroid impact detector devices in use prior to the present invention consisted of pressurized cells small cadmium sulfide cell detectors, steel covered wire grids, copper wire-wound cards, and capacitance type detectors. The pressurized cells previously used comprised a can type detector having a small exposed area (approx. 1 sq. ft.) which were made to detect micrometeoroid penetration of its thin skins (approx. .005″ and under). Their use with larger areas and thicker skinned materials is therefore not practical. The exposed detector weight-to-area ratio was disadvantageous in many cases since only one side of the detector was exposed to the micrometeoroid hazard. Most of these detectors were unusable at high temperatures due to melting or decomposition of the component parts. Furthermore, the previous structures were more complicated than the present invention, and this increased the potential for malfunctions.

The present invention provides a micrometeoroid detector having relatively large areas (several square feet and larger), an improved weight-to-area ratio for any given thickness and material, an extremely simple design entailing a minimum number of parts which enhances its reliability and facilitates ease of production.

It is therefore an object of the present invention to provide a micrometeoroid detection device that can be fabricated from a variety of spacecraft materials and skin thicknesses, and in an unlimited variety of sizes, shapes and curvatures.

Another object of the present invention is to provide a detection device that can be simply constructed, lightweight, need little or no support structure, and require a minimum of mounting hardware.

Still another object of the present invention is to provide a device which can have both sides exposed to the micrometeoroid environment so as to provide a better area-to-weight ratio.

A still further object of the present invention is to provide a detector device having the ability to withstand a wide range of temperatures, and be insensitive to space radiation.

These and other objects of the present invention will become more apparent from a reading of the following description.

Figure 1:
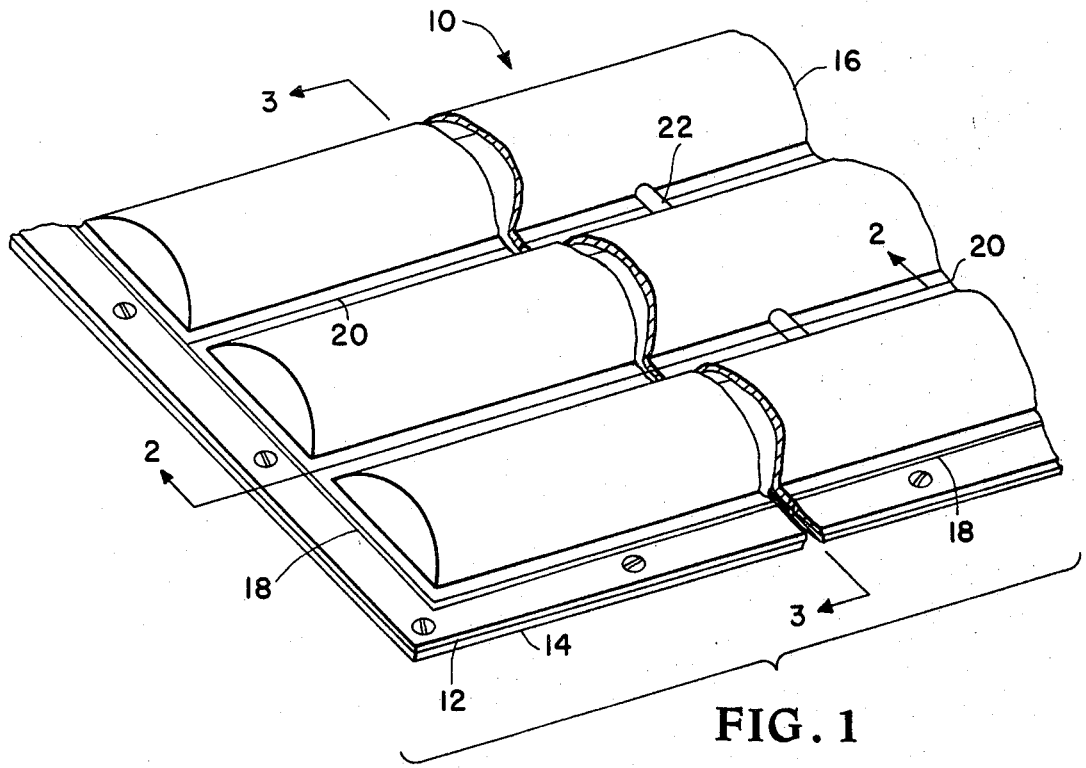
Figure 2:
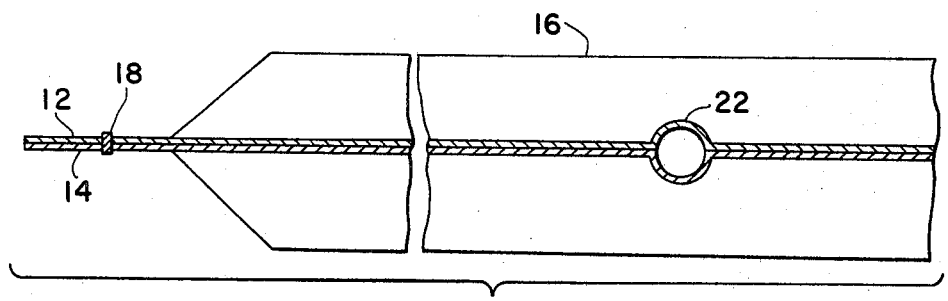
Figure 3:
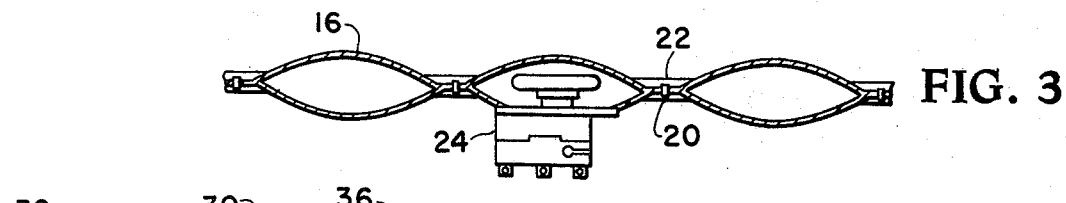
Figure 4:
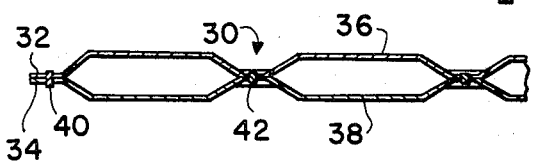
Figure 5:
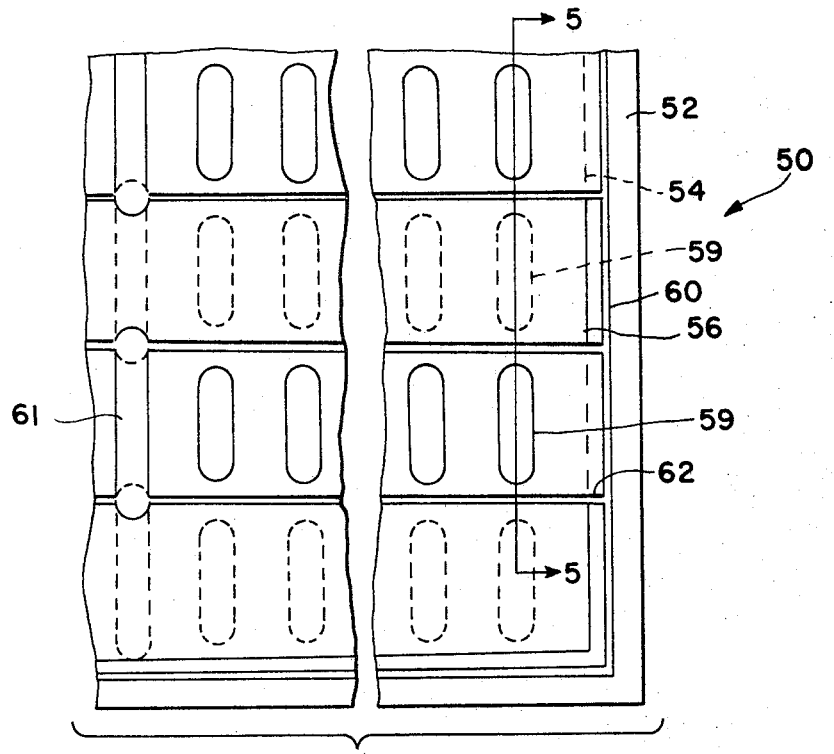
Figure 6:
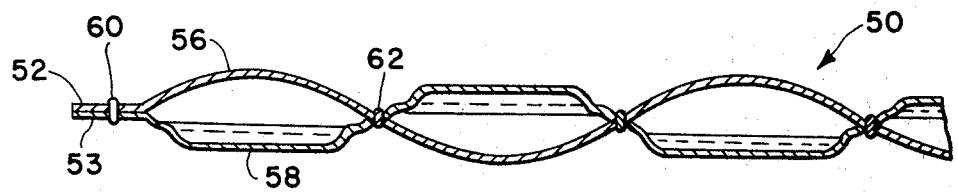
Figure 7:
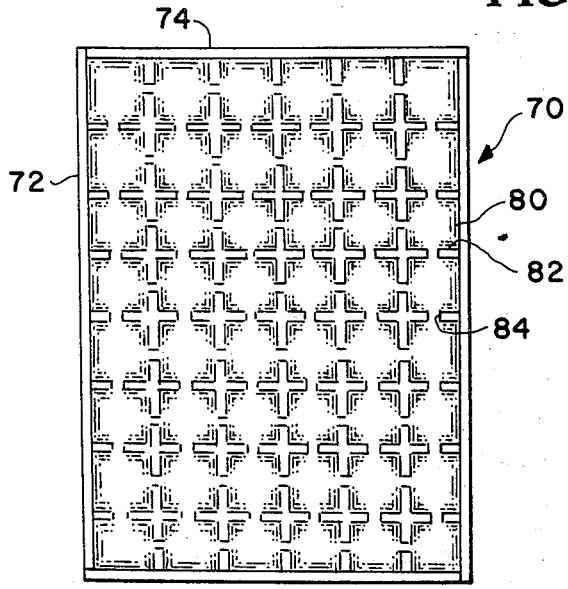

In the drawing:
FIG. 1 shows an isometric view of the invention panel and the manner of attaching the metallic sheets so as to form a panel;
FIG. 2 is a cross sectional view taken along the section line 2—2 of FIG. 1;
FIG. 3 is a cross sectional view taken along line 3—3 of FIG. 1;
FIG. 4 is a cross sectional view of another embodiment of the present invention;
FIG. 5 is a top view of another embodiment of the present invention showing a panel stiffener arrangement;
FIG. 6 is a cross sectional view of the stiffener embodiment taken along line 5—5 of FIG. 5; and
FIG. 7 is a top view of another embodiment of the present invention having a waffle celled configuration.

Referring now to FIG. 1, wherein the numeral 10 designates generally the invention, there is shown a section of the detector panel 10 formed by placing together two sheets of test material 12 and 14, welding or joining in some other manner, such as bonding, diffusion bonding, brazing, these sheets about the panel periphery 18 and cell periphery 20 so as to form cells 16. This method may be utilized to form the waffle configuration of FIG. 7 and the stiffener reinforced conguration of FIG. 5 by forming the sheets 12 and 14 in a suitable configuration.

The cell periphery welds 20 are interrupted at one place where pressure connector tubes 22 are formed. These tubes serve to provide a panel which has interconnected cells. In this way, only one pressure sensor is needed to detect the penetration of any part of the exposed area of each panel. The location of these pressure sensors 24 on each panel is indicated in FIG. 3. This figure shows a side view of the panel taken along a cell periphery weld. A pressure sensor 24 of the type disclosed in Pat. 3,238,744 is shown attached to a flattened part of the cell wall. These sensors may be located on any one cell or group of interconnected cells in the panel and preferably closest to the data recording mechanism of the satellite so as to keep connector wiring to a minimum. The cross sectional view of FIG. 3 gives a clearer indication of the location of the pressure sensor 24.

An alternate embodiment of the present invention designated generally by the reference numeral 30 has flattened detector cells as shown in a cross sectional view in FIG. 4. In this embodiment there is an upper sheet 32 and a lower sheet 34. They are joined at the periphery with a weld 40. Weld 42 also joins the sheets along the tubular portions 36 and 38.

Another arrangement of the invention is shown in FIGS. 5 and 6 and designated generally by the reference numeral 50. This embodiment may have a preformed upper sheet 52 and lower sheet 54 joined by a periphery weld 60. The cell portions of the upper sheet are alternately tubular and flat as are the cells of the bottom sheet; however, the sheets are joined so that the cells are formed of tubular portions 56 that oppose the flat portions 58. The sheets are joined between the cells by weld 62. Stiffeners 59 may be preformed in the alternate flat cell portions so that one side of the cell will have the tubular configuration while the other side has a stiffener configuration. These stiffeners are tubular projections formed in the flattened portion of the cell wall. The central stiffener tube 61 (FIG. 5) extends from one cell to the next across the panel and acts as a pressure conduit for interconnecting the cells.

The panels and cells can be made in any shape, size or curvature. This is illustrated by the waffle configuration of the panel and its cells shown in FIG. 7 and designated generally by the reference numeral 70. This panel, like the others has an upper sheet 72 and lower sheet 74 welded at 80 around its periphery. The cell configuration is obtained by seam welds 82 which leave spaces 84 for pressurized communication between the cells.

In operation the panels in all of the embodiments are provided with a pressure sensitive switch and the panels pressurized by known techniques. The panels are incorporated into a space vehicle of chosen design and are positioned so that both sides of the cells are exposed to meteoroid penetration in the space environment. When a cell is penetrated a pressure loss occurs which is detected and recorded by conventional mechanism.

What is claimed as new and desired to be secured by Letters Patent of the United States is:

1. A micrometeoroid penetration detecting apparatus comprising:
  self-supporting pressurized detector panel means, said panel means consisting of two thin sheets of metal joined together, said sheets being joined in such a manner that they form a plurality of cells to make up an integrated self-supporting unit; said cells having an internal volume substantially greater than that of the sheets thereby providing a lightweight structure; and
  pressure sensors means associated with said cells for detecting pressure drop due to meteoroid penetration of cell walls.

2. A micrometeoroid detecting apparatus as in claim 1 wherein said cells have passages therebetween, said pressure sensor means detecting pressure drop due to micrometeoroid penetration of any panel cell wall.

3. The apparatus as in claim 1 wherein both sides of the detector panel means are exposed to the micrometeoroid environment.

4. The apparatus as in claim 1 having an exposed surface area approaching that of the projected flat plate area.

5. The apparatus as in claim 1 wherein the panel cells are tubular.

6. The apparatus as in claim 1 wherein the panel cells have alternate and opposed tubular and flat portions.

7. The apparatus as in claim 1 wherein the flat portions have stiffeners formed therein.

8. The apparatus as in claim 1 wherein the sheets and cell areas are joined by welding.

9. The apparatus as in claim 1 wherein the panel cells have alternate and opposed tubular and flat cell portions;
  said flat cell portions having stiffeners;
  said stiffeners being protrusions located at spaced intervals and generally transverse to the tubular and flat cell portions.

10. A micrometeoroid detecting apparatus as in claim 1 wherein said cells are individual pressurized compartments, and pressure sensor means for each cell.

References Cited
UNITED STATES PATENTS

| | | | |
|---|---|---|---|
| 657,672 | 9/1911 | Petternell | 109—42 X |
| 3,238,774 | 3/1966 | Gurtler | 73—170 |

S. CLEMENT SWISHER, Primary Examiner